United States Patent
Masuyama

(10) Patent No.: US 10,296,130 B2
(45) Date of Patent: May 21, 2019

(54) DISPLAY CONTROL APPARATUS, DISPLAY CONTROL METHOD, AND STORAGE MEDIUM STORING RELATED PROGRAM

(71) Applicant: CANON KABUSHIKI KAISHA, Tokyo (JP)

(72) Inventor: Kimihiro Masuyama, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 91 days.

(21) Appl. No.: 15/157,032

(22) Filed: May 17, 2016

(65) Prior Publication Data

US 2016/0342267 A1 Nov. 24, 2016

(30) Foreign Application Priority Data

May 18, 2015 (JP) .................. 2015-101425
Apr. 15, 2016 (JP) .................. 2016-081962

(51) Int. Cl.
*G06F 3/041* (2006.01)

(52) U.S. Cl.
CPC .................. *G06F 3/0416* (2013.01)

(58) Field of Classification Search
CPC .... G06F 3/0485; G06F 3/0416; G06F 3/0488; G06F 3/04886; G06F 3/0317; G06F 3/0235; G06F 3/03547; G06F 3/041; G06F 3/0412; G06F 3/04812; G06F 3/04845; G06F 3/04855; G06F 2203/04808; G06F 2203/04104; Y10S 715/973; Y10S 715/974
See application file for complete search history.

(56) References Cited

U.S. PATENT DOCUMENTS

| | | | | |
|---|---|---|---|---|
| 7,453,439 B1* | 11/2008 | Kushler | ............... | G06F 3/0237 345/168 |
| 8,136,052 B2* | 3/2012 | Shin | ................... | G06F 3/04886 715/835 |
| 2008/0034316 A1* | 2/2008 | Thoresson | ......... | G06F 3/04855 715/781 |
| 2013/0207909 A1* | 8/2013 | Tanzawa | ................ | G06F 3/041 345/173 |

FOREIGN PATENT DOCUMENTS

| | | |
|---|---|---|
| CN | 101354608 A | 1/2009 |
| CN | 102109922 A | 6/2011 |
| CN | 102681721 A | 9/2012 |
| CN | 102906675 A | 1/2013 |
| CN | 103309605 A | 9/2013 |
| JP | H06-89137 A | 3/1994 |
| JP | 2010-287241 A | 12/2010 |

\* cited by examiner

*Primary Examiner* — Nalini Mummalaneni
(74) *Attorney, Agent, or Firm* — Canon USA, Inc., IP Division

(57) ABSTRACT

An information processing apparatus includes an operation unit equipped with a touch screen disposed on a display device. Coordinate information indicating a detected touch position is output from the touch screen to a CPU. The CPU sequentially stores coordinate information about respective touch positions in a memory. The CPU determines whether there is any change in a moving direction of the touch position, with reference to a history of the touch positions. If it is determined that the moving direction of the touch position has changed, the CPU invalidates the touch position detected after determination of the change until action of a touch-up operation.

6 Claims, 9 Drawing Sheets

DISPLAY CONTROL APPARATUS, DISPLAY CONTROL METHOD, AND STORAGE MEDIUM STORING RELATED PROGRAM

BACKGROUND OF THE INVENTION

Field of the Invention

The present disclosure generally relates to display control and, more particularly, to a display control apparatus, a method for controlling the display control apparatus, and a storage medium that stores a related program. More specifically, the present disclosure relates to a technique capable of detecting the position of an object (e.g., a finger or a stylus pen) that contacts a touch screen.

Description of the Related Art

The number of information processing terminals each being equipped with a touch screen is rapidly increasing, recently. The touch screen is usually disposed on a display device and is configured to realize operational feeling as if a user were directly operating a display element. More specifically, the touch screen enables a user to perform an intuitive operation in such a manner that an input target constantly coincides with an operation target. In other words, the touch screen can realize an operation system that is easy to use and is easy to understand.

A conventional touch screen is, for example, capable of measuring an output of a capacitance sensor. If a measurement value exceeds a threshold when an object (e.g., a finger or a pen) has approached an operation surface, the touch screen determines that a touch operation has been performed by the object. Then, the touch screen calculates a coordinate value of the touch position and outputs the calculated coordinate value.

However, at a moment when a user starts physically moving the object away from the operation surface, the touch screen does not immediately stop detecting the contact by the object and does not determine that the touch operation has been cancelled. There is a time lag of several milliseconds before the sensor output becomes smaller than a predetermined threshold. For example, as illustrated in FIG. 9A, when a user moves an object 911 away from a touch screen 900 at a desired position 912, calculation of the touch position continues for a while (e.g., from the position 912 to a position 913) even after the user has cancelled the touch operation. Therefore, in an actual operation, the detection of the object contact terminates at the position 913 where the sensor output becomes smaller than the predetermined threshold. The position 913 is recognized as the position where the touch operation has been cancelled. As a result, for example, in a case where a slider bar 920 is displayed on the touch screen 900 and a slider is movable on the slider bar 920 according to a user touch operation, there will be a problem that the identified position where the touch operation has been cancelled does not coincide with user's intended position.

The present disclosure intends to solve the above-mentioned problem. When a touch operation is performed on the touch screen, the present disclosure prevents a deviation from occurring between a touch position detected according to the touch operation and user's operational feeling.

SUMMARY OF THE INVENTION

According to an aspect of the present disclosure, an information processing apparatus includes at least one processor; and at least one memory storing a program which, when executed by the at least one processor, causes the information processing apparatus to detect an object that contacts a touch screen, sequentially store an object contact position while an object contact state is continuously detected, determine whether a moving direction of the object contact position has changed, with reference to the stored position, and invalidate the object contact position detected after determination of the change in the moving direction of the object contact position until termination of the continuous detection of the object contact state if a time elapsed after the determination of the change in the moving direction of the object contact position until the termination of the continuous detection of the object contact state is within a predetermined time.

Further features of the present disclosure will become apparent from the following description of exemplary embodiments with reference to the attached drawings.

DESCRIPTION OF THE EMBODIMENTS

Hereinafter, exemplary embodiments of the present disclosure will be described in detail with reference to attached drawings.

Figure 1:
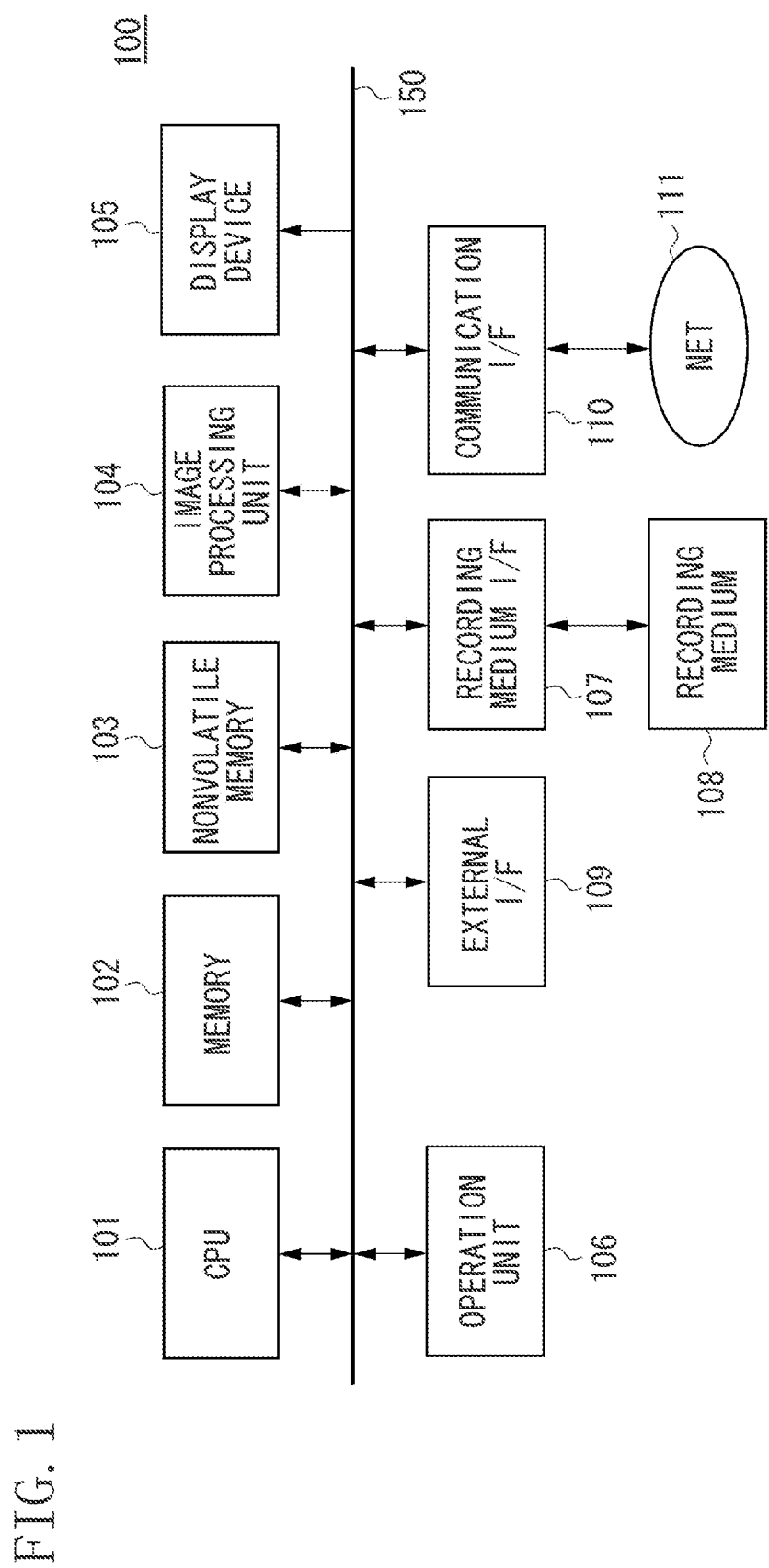
FIG. 1 is a block diagram illustrating a configuration of a display control apparatus according to an exemplary embodiment of the present disclosure.

A first exemplary embodiment will be described in detail below. FIG. 1 is a block diagram illustrating a schematic configuration of a display control apparatus 100 according to the present disclosure. For example, the display control apparatus 100 can be realized by a personal computer (hereinafter, referred to as "PC") or an information processing apparatus, such as a tablet terminal.

The display control apparatus 100 includes a central processing unit (CPU) 101, which may include one or more processors, a memory 102, a nonvolatile memory 103, an image processing unit 104, a display device 105, an operation unit 106, a recording medium interface (I/F) 107, an external I/F 109, and a communication I/F 110, which are mutually connected via an internal bus 150. Respective devices connected to the internal bus 150 can mutually transmit and receive data via the internal bus 150. As used herein, the term "unit" generally refers to any combination of software, firmware, hardware, or other component, such as circuitry, that is used to effectuate a purpose.

The memory 102 is, for example, a random access memory (RAM), which is a volatile memory made of a semiconductor element. For example, the CPU 101 uses the memory 102 as a work memory and controls each unit of the display control apparatus 100 according to a program stored in the nonvolatile memory 103. The nonvolatile memory 103 stores image data, audio data, and other data. The nonvolatile memory 103 stores a plurality of types of programs, according to which the CPU 101 can perform various operations. The nonvolatile memory 103 is, for example, a hard disk drive (HDD) or a read only memory (ROM).

The image processing unit 104 can perform various types of image processing on image data stored in the nonvolatile memory 103 and a recording medium 108, video data acquired via the external I/F 109, and image data acquired via the communication I/F 110, under the control of the CPU 101. The image processing that can be performed by the image processing unit 104 includes A/D conversion processing, D/A conversion processing, image data coding processing, compression/expansion processing, enlargement/reduction processing (resizing processing), noise reduction processing and color conversion processing. If desired, the image processing unit 104 can be constituted by a circuit block dedicated to perform specific image processing. To facilitate understanding, the CPU 101 and the image processing unit 104 are described as independent units. However, a part or the whole of the functions of the image processing unit 104 can be realized by a program running on the CPU 101.

The display device 105 can display images and GUI screens (i.e., screens that constitute a graphical user interface (GUI)), under the control of the CPU 101. The CPU 101 can generate a display control signal according to a program to control each unit of the display control apparatus 100, in such a way as to generate a video signal and output the generated video signal to the display device 105. The display device 105 can display a video based on the received video signal. If desired, the configuration of the display control apparatus 100 can be modified in such a way as to separate the display device 105 from the interface that outputs a video signal to the display device 105. In this case, the display device 105 can be constituted as an external monitor (e.g., a television set).

The operation unit 106 is an input device that can accept a user operation. For example, the operation unit 106 includes a character information input device (e.g., a keyboard), a pointing device (e.g., a mouse or a touch screen), buttons, a dial, a joystick, a touch sensor, and a touchpad. The touch screen is a position input device that can output coordinate information about a position touched by an object (e.g., a finger or a stylus pen). The touch screen is disposed on a display portion of the display device 105 in an overlapped manner. The touch screen according to the present exemplary embodiment can be constituted as a resistive film type, a capacitance type, a surface acoustic wave type, an infrared type, an electromagnetic induction type, an image recognition type, or an optical sensor type. In the present exemplary embodiment, any of the above-described sensor types may be used. For example, the touch screen according to the present exemplary embodiment can measure an output of a capacitance sensor and detect an object that has approached an operation surface if a measurement value exceeds a threshold. At this moment, the touch screen determines that a touch operation by the object has been performed. Accordingly, in the following description, the state of "an object being in contact with the touch screen" includes not only a state where the object is in direct contact with an operation surface of the touch screen but also a state where the object is sufficiently adjacent to the operation surface (i.e., a hover state).

The CPU 101 can detect the following actions and states of an object on the touch screen. The action of an object that contacts the touch screen is hereinafter referred to as "Touch-Down." The state of an object that is kept in contact with the touch screen is hereinafter referred to as "Touch-On." The action of an object that moves while it is kept in contact with the touch screen is hereinafter referred to as "Touch-Move." The action of an object moving away from the touch screen is hereinafter referred to as "Touch-Up." The state of an object that is kept away from the touch screen is hereinafter referred to as "Touch-Off."

Position coordinate information about an object that contacts the touch screen can be notified from the touch screen to the CPU 101 via the internal bus 150. Then, the CPU 101 determines the type of each touch operation performed on the touch screen based on a change of the touch position coordinate information notified from the touch screen.

When the action of an object is Touch-Move, the CPU 101 can determine a vertical component and a horizontal component of a moving direction of the object moving on the touch screen based on a change of the position coordinate information. Further, if the action of an object changes from "Touch-Down" to "Touch-Up" via "Touch-Move" on the touch screen, the CPU 101 determines that the object has drawn a stroke. An operation that quickly draws a stroke is referred to as "Flick." The action "Flick" is an operation characterized by quickly moving an object by a certain distance while keeping the object in contact with the touch screen and then releasing the object from the touch screen. In other words, the action "Flick" represents a motion of an object quickly shifting on the touch screen while a user flicks the object at the touch screen. If the distance of a detected touch-move operation is not shorter than a predetermined distance and the speed of the touch-move operation is not less than a predetermined speed, and further if a touch-up operation is subsequently detected, the CPU 101 determines that the detected action is "Flick." Further, if the distance of a detected touch-move operation is not shorter than the predetermined distance and the speed of the touch-move operation is less than the predetermined speed, the CPU 101 determines that the detected action is "Drag."

The storage medium I/F 107 is an interface capable of connecting the display control apparatus 100 to the recording medium 108, such as a memory card, a compact disk (CD) (registered trademark), or a digital versatile disk (DVD) (registered trademark). The storage medium I/F 107 can read and write data from and to the recording medium 108 under the control of the CPU 101.

The external I/F 109 is an interface that can connect the display control apparatus 100 to an external device via a wired or wireless communication tool. The external I/F 109 can input and output video signals and audio signals to and from the external device. The communication I/F 110 is an interface that can transmit and receive files and control signals to and from an external device, directly or via an internet 111.

A position detecting operation according to the present exemplary embodiment will be described in detail below with reference to a user touch operation that causes a slider to slide on a slider bar. In the present exemplary embodiment, the display control apparatus 100 successively monitors a moving direction of the touch position. If the moving direction has changed, the display control apparatus 100 invalidates a parameter change of the touch position for a predetermined time. Therefore, when a user performs a touch-up operation, the display control apparatus 100 can prevent the detection of the touch position from being differentiated from an operational feeling of the user.

Figure 2:
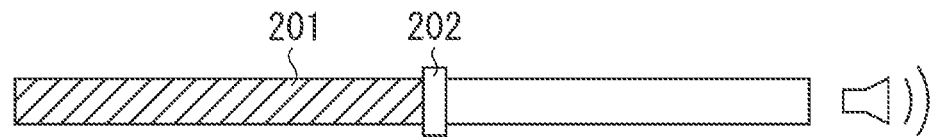
FIG. 2 illustrates a slider bar displayed on a touch screen according to an exemplary embodiment of the present disclosure.

FIG. 2 illustrates a volume controller as an example of the slider bar displayed on the display device 105. The length between the left edge of a slider bar 201 and the momentary position of a slider 202 indicates the volume of sounds. The slider 202 is disposed on the slider bar 201 in such a way as to slide along the slider bar 201. If a user performs a touch-down operation in the vicinity of the slider 202, the CPU 101 brings the slider 202 into a movable state. If a user performs a touch-move operation on the slider 202 in a state where the slider 202 is movable, the CPU 101 causes the slider 202 to move along the slider bar 201. The length between the left edge of the slider bar 201 and the setting position of the slider 202 expands or contracts according to the movement of the slider 202. The CPU 101 refers to the setting position of the slider 202 on the slider bar 201 and determines the volume of sounds to be output from a speaker based on the setting position.

Figure 3:
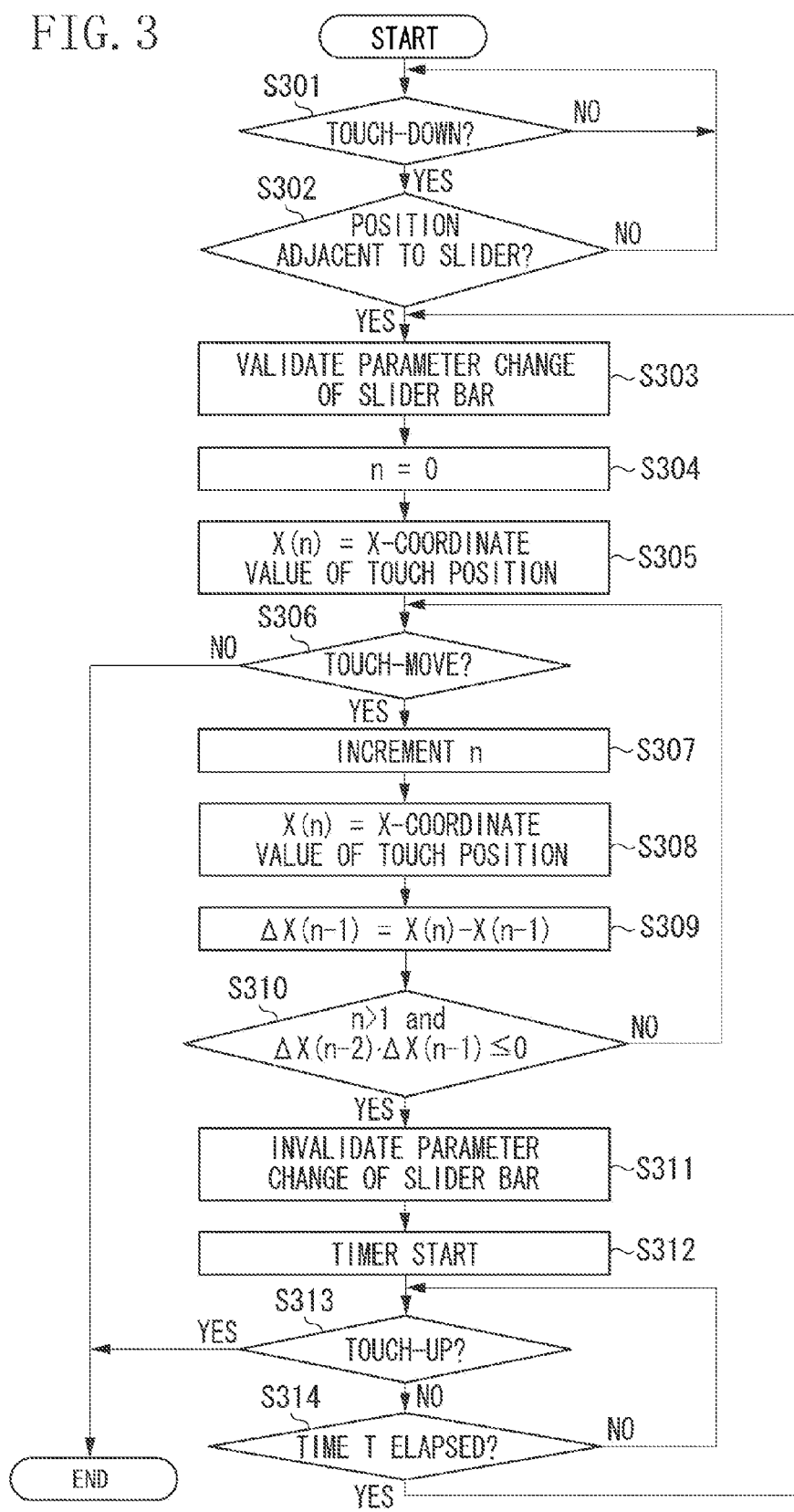
FIG. 3 is a flowchart illustrating an example of a touch position detection processing according to an exemplary embodiment of the present disclosure.

FIG. 3 is a flowchart illustrating processing that can be performed by the display control apparatus 100 according to the present exemplary embodiment. The processing illustrated in FIG. 3 includes determining whether there is any change in the moving direction of the touch position within a predetermined time before detection of a touch-up operation and invalidating the touch position during a period from the change detection to the touch-up operation. At the start timing, it is assumed that there is not any object being in contact with the touch screen. In other words, the object is in a touch-off state.

In step S301, the CPU 101 determines whether a touch-down operation has been detected. If it is determined that the detected operation is Touch-Down (Yes in step S301), then in step S302, the CPU 101 determines whether a touch position where the touch-down operation has been detected is adjacent to the slider 202. For example, when the touch position is within ±10 pixels from the coordinates of the slider 202, the CPU 101 determines that the operation having been detected in the vicinity of the slider 202 is "Touch-Down."

If the CPU 101 determines that the touch position is adjacent to the slider 202 (Yes in step S302), then in step S303, the CPU 101 validates the parameter change of the slider bar 201. In a state where the parameter change of the slider bar 201 is valid, the CPU 101 detects the touch position if a user performs a touch-move operation on the slider 202 and displays the slider 202 at a position corresponding to the detected touch position. More specifically, the user can move the slider 202 in the right-and-left direction on the slider bar 201. The CPU 101 refers to the setting position of the slider 202 on the slider bar 201 and determines the volume of sounds to be output from the speaker based on the setting position.

In step S304, the CPU 101 resets a counter n (n=0). Then, in step S305, the CPU 101 stores a variable X(n) that represents the X-coordinate value of the touch position, in the memory 102. More specifically, the CPU 101 sequentially stores coordinate values of the latest plurality of touch positions in the array variable X(n) of the memory 102, as a history of touch positions during a predetermined time having elapsed immediately before the present. The CPU 101 sequentially deletes an older X-coordinate value if a predetermined number of new X-coordinate values have been stored after the storage thereof or when a predetermined time has elapsed after the detection thereof. The slider 202 according to the present exemplary embodiment is movable only in the X direction. Therefore, in the present exemplary embodiment, only the X-coordinate value is taken into consideration.

In step S306, the CPU 101 determines whether a touch-move operation has been detected. If it is determined that there is not any touch-move operation having been detected (No in step S306), the CPU 101 terminates the touch position detection processing of the flowchart illustrated in FIG. 3. If it is determined that the detected operation is Touch-Move (Yes in step S306), then in step S307, the CPU 101 increments the counter n by one. Further, in step S308, the CPU 101 stores the X-coordinate value of the touch position as the variable X(n) in the memory 102.

In step S309, the CPU 101 calculates an X-coordinate variation $\Delta X(n-1)=X(n)-X(n-1)$ between the temporally neighboring touch positions. In step S310, the CPU 101 determines whether a condition $n>1$ and $\Delta X(n-2) \cdot \Delta X(n-1) \leq 0$ is satisfied. Satisfying the condition $\Delta X(n-2) \cdot \Delta X(n-1) \leq 0$ indicates that the moving direction of the slider 202 has been changed or the slider 202 has stopped. More specifically, the condition $\Delta X(n-2) \cdot \Delta X(n-1) \leq 0$ indicates an occurrence of change in the moving direction of the touch position. If the CPU 101 determines that the condition $n>1$ and $\Delta X(n-2) \cdot \Delta X(n-1) \leq 0$ is satisfied (Yes in step S310), the operation proceeds to step S311. Otherwise, the operation returns to step S306.

In step S311, the CPU 101 invalidates the parameter change of the slide bar 201. In step S312, the CPU 101 causes a timer to start its operation. When the parameter change of the slider bar 201 is invalid, the CPU 101 does not detect the touch position or does not reflect the detected touch position to the display position of the slider 202 even when a touch-move operation of the object is performed on the slider 202. Hereinafter, the CPU 101 does not move the slider 202 on the slider bar 201. In other words, the slider 202 displayed on the display device 105 is in a stopped state.

In step S313, the CPU 101 determines whether a touch-up operation has been detected. If it is determined that the detected operation is Touch-Up (Yes in step S313), the CPU 101 terminates the touch position detection processing of the flowchart illustrated in FIG. 3. In this case, the CPU 101 acquires the value of the touch position X(n) detected before the parameter change of the slider bar is invalidated in step S311, as a position where the touch-up operation has been determined.

On the other hand, if it is determined that there is not any touch-up operation having been detected (No in step S313), then in step S314, the CPU 101 determines whether time T has elapsed since the start of the timer operation. The time T is set to a time that is not reliable with respect to the input position immediately before the touch-up operation is performed. For example, the time T value having been set beforehand is approximately 50 milliseconds. If the CPU 101 determines that the elapsed time is shorter than the time T (No in step S314), the operation returns to step S313. On the other hand, if the CPU 101 determines that the time T has already elapsed (Yes in step S314), the operation returns to step S303. In step S303, the CPU 101 validates the parameter change of the slider bar 201 again.

In the present exemplary embodiment, if a change occurs in the slider moving direction, the CPU 101 invalidates the move operation performed on the slider 202 for a predetermined time. Therefore, the CPU 101 does not reflect a momentarily detected touch position as a position of the touch-up operation. Accordingly, the present exemplary embodiment brings an effect of preventing a deviation from occurring between the position of the slider 202 in the touch-up operation and the user's intended position. As a result, reducing a possibility that a user feels strangeness in operation becomes feasible.

Although the CPU 101 directly stores the X-coordinate value of the touch position as the variable X(n) in steps S305 and S308, the CPU 101 can calculate a movement average sampled a plurality of times and store the calculated average as the variable X(n). Such a modification brings an effect of smoothing the change of the touch position and reducing an error occurring in the detection of the change of the slider moving direction.

Figure 4:
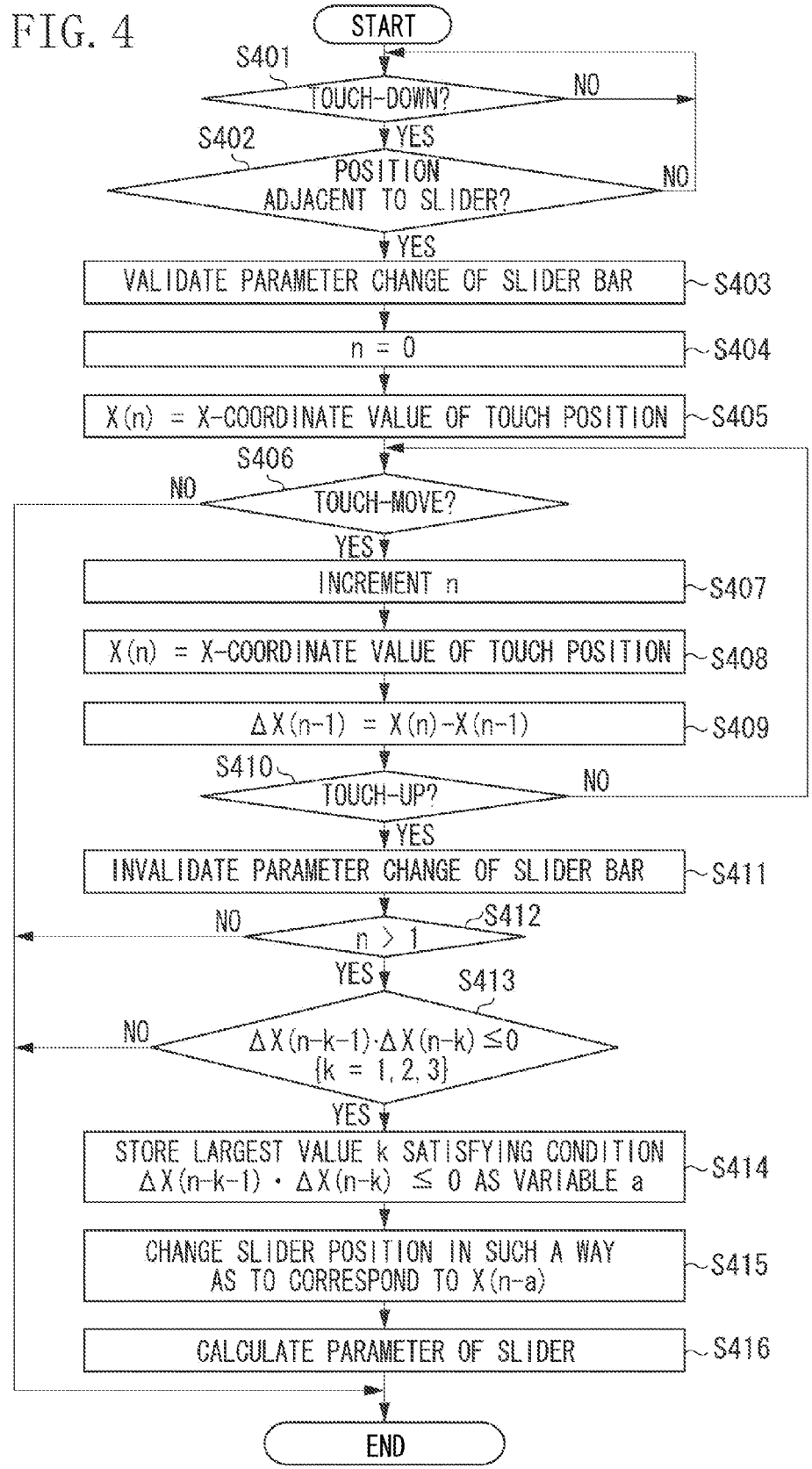
FIG. 4 is a flowchart illustrating an example of touch position detection processing according to an exemplary embodiment of the present disclosure.

A second exemplary embodiment will be described in detail below. FIG. 4 is a flowchart illustrating processing that can be performed by the display control apparatus 100 according to the present exemplary embodiment. The processing illustrated in FIG. 4 includes determining whether there is any change in the moving direction of the touch position while a predetermined number of detections has been performed before detection of a touch-up operation and invalidating the touch position during a period from the change detection to the touch-up operation if there is a change. At the start timing, it is assumed that there is not any object being in contact with the touch screen. In other words, the object is in the touch-off state.

In step S401, the CPU 101 determines whether a touch-down operation has been detected. If it is determined that the detected operation is Touch-Down (Yes in step S401), then in step S402, the CPU 101 determines whether a touch position where the touch-down operation has been detected is adjacent to the slider 202. If the CPU 101 determines that the touch position is adjacent to the slider 202 (Yes in step S402), then in step S403, the CPU 101 validates the parameter change of the slider bar 201.

In step S404, the CPU 101 resets the counter n (n=0). Then, in step S405, the CPU 101 stores the X-coordinate value of the touch position as the variable X(n) in the memory 102. More specifically, the CPU 101 sequentially stores the variable X(n) in the memory 102, as a history of touch positions during a predetermined number of detections immediately before the present. The slider 202 of the slider bar 201 according to the present exemplary embodiment is movable only in the X direction. Therefore, in the present exemplary embodiment, only the X-coordinate value is taken into consideration.

In step S406, the CPU 101 determines whether a touch-move operation has been detected. If it is determined that there is not any touch-move operation having been detected (No in step S406), the CPU 101 terminates the touch position detection processing of the flowchart illustrated in FIG. 4. If it is determined that the detected operation is Touch-Move (Yes in step S406), then in step S407, the CPU 101 increments the counter n by one. In step S408, the CPU 101 stores the X-coordinate value of the touch position as the variable X(n) in the memory 102.

In step S409, the CPU 101 calculates an X-coordinate variation $\Delta X(n-1)=X(n)-X(n-1)$ between the temporally neighboring touch positions. In step S410, the CPU 101 determines whether a touch-up operation has been detected. If it is determined that the detected operation is Touch-Up (Yes in step S410), then in step S411, the CPU 101 invalidates the parameter change of the slider bar 201. The operation proceeds to step S412. If the CPU 101 determines that there is not any touch-up operation having been detected (No in step S410), the operation returns to step S406.

In step S412, the CPU 101 determines whether a condition n>1 is satisfied. If the condition n>1 is satisfied (Yes in step S412), the operation proceeds to step S413. If a condition n=1 is satisfied (No in step S412), the CPU 101 terminates the touch position detection processing of the flowchart illustrated in FIG. 4.

In step S413, the CPU 101 determines whether a condition $\Delta X(n-k-1)\cdot\Delta X(n-k)\leq 0$ (k=1, 2, and 3) is satisfied. The processing to be performed in step S413 intends to determine the presence of any change in the moving direction of the slider 202 for the past three touch positions detected immediately before the touch-up operation. The basic interval can be set during the loop processing from step S407 to step S410. For example, the interval is set to milliseconds. If the counter n is 2, namely, when acquiring the value X(n−k−1) for respective touch positions k=1, 2, and 3 is unfeasible, the CPU 101 checks the presence of any change in the moving direction of the slider 202 in a limited range in which the value X(n−k−1) can be acquired. For example, when the counter n is 2, the CPU 101 checks the presence of any change in the moving direction of the slider 202 for only one touch position k=1. If the counter n is 3, the CPU 101 checks the presence of any change in the moving direction of the slider 202 for two touch positions k=1 and 2.

If the CPU 101 determines that there is a change in the moving direction of the slider 202 at any one of three touch positions k=1, 2, and 3, more specifically, when the CPU 101 determines that condition $\Delta X(n-k-1)\cdot\Delta X(n-k)\leq 0$ is satisfied (Yes in step S413), the operation proceeds to step S414. In step S414, the CPU 101 calculates the largest k that can satisfy the condition $\Delta X(n-k-1)\cdot\Delta X(n-k)\leq 0$. The k value obtained through the above calculation indicates the concerned touch position (i.e., one of three touch positions detected immediately before the touch-up operation) where the change in the moving direction of the slider 202 has been initially detected. In step S414, the CPU 101 stores the acquired k value as a variable a in the memory 102.

Figure 5:
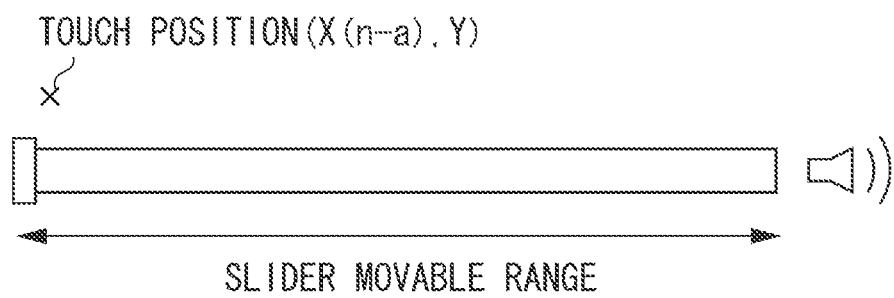
FIG. 5 illustrates a slider bar displayed on a touch screen in relation to an object touch position according to an exemplary embodiment of the present disclosure.

In step S415, the CPU 101 changes the position of the slider 202 on the slider bar 201 in such a way as to correspond to X(n−a). More specifically, there is a possibility that the position indicated by X(n−a) is outside the movable range of the slider 202 as illustrated in FIG. 5. If the position indicated by X(n−a) is within the movable range, the CPU 101 moves the slider 202 to the position X(n−a). If the position indicated by X(n−a) is outside the movable range, the CPU 101 moves the slider 202 to a position closest to X(n−a) in the movable range.

In step S416, the CPU 101 calculates a parameter of the slider bar 201 based on the position of the slider 202 determined in step S415 and terminates the touch position detection processing of the flowchart illustrated in FIG. 4.

The position detection processing illustrated in FIG. 4 brings an effect of preventing the touch position in a touch-up operation from being erroneously input if a change occurs in the moving direction of the touch position immediately before the touch-up operation. In other words, the position detection processing illustrated in FIG. 4 brings an effect of preventing a deviation from occurring between the displayed slider position in the touch-up operation and the user's intended position. As a result, reducing a possibility that a user feels strangeness in operation becomes feasible. Further, the display control apparatus according to the present exemplary embodiment invalidates the parameter change of the slider bar after the detection of the touch-up operation. Such a control brings an effect of causing the slider bar to move quickly in response to a touch during a touch-move operation.

In the flowchart illustrated in FIG. 4, the CPU 101 calculates variations of the past three touch positions detected immediately before the touch-up operation. The number of past touch positions to be referred to in the above-mentioned calculation is not limited to three and can be changed appropriately according to the detection interval.

A third exemplary embodiment will be described in detail below. Processing according to the third exemplary embodiment includes successively monitoring the moving direction of a touch position on a GUI that can detect a flick input operation and detecting a touch position capable of reducing strangeness in feeling in the flick input operation.

Figure 6:
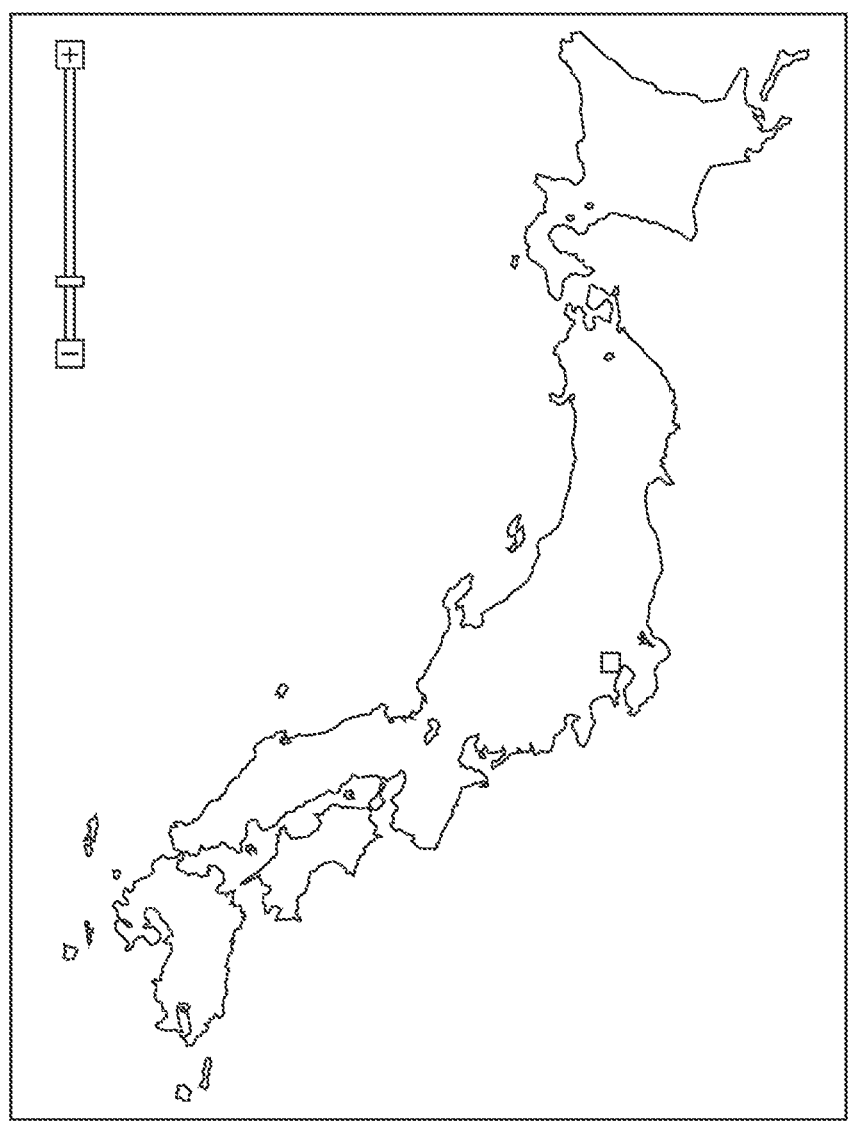
FIG. 6 illustrates contents that can be displayed on the touch screen according to an exemplary embodiment of the present disclosure.

FIG. 6 illustrates a GUI display screen dedicated to a maps application, as an example of the GUI. If a user performs a touch-down operation on a map portion of the GUI display screen, the map portion is brought into a scrollable state. In a state where the map portion is scrollable, the user can perform a flick operation to scroll the map portion in such a way as to update the content to be displayed. If the user performs the flick operation, the display control apparatus performs a predetermined amount scroll according to the speed of the flick operation. The display content of the map portion can be updated correspondingly.

Figure 7:
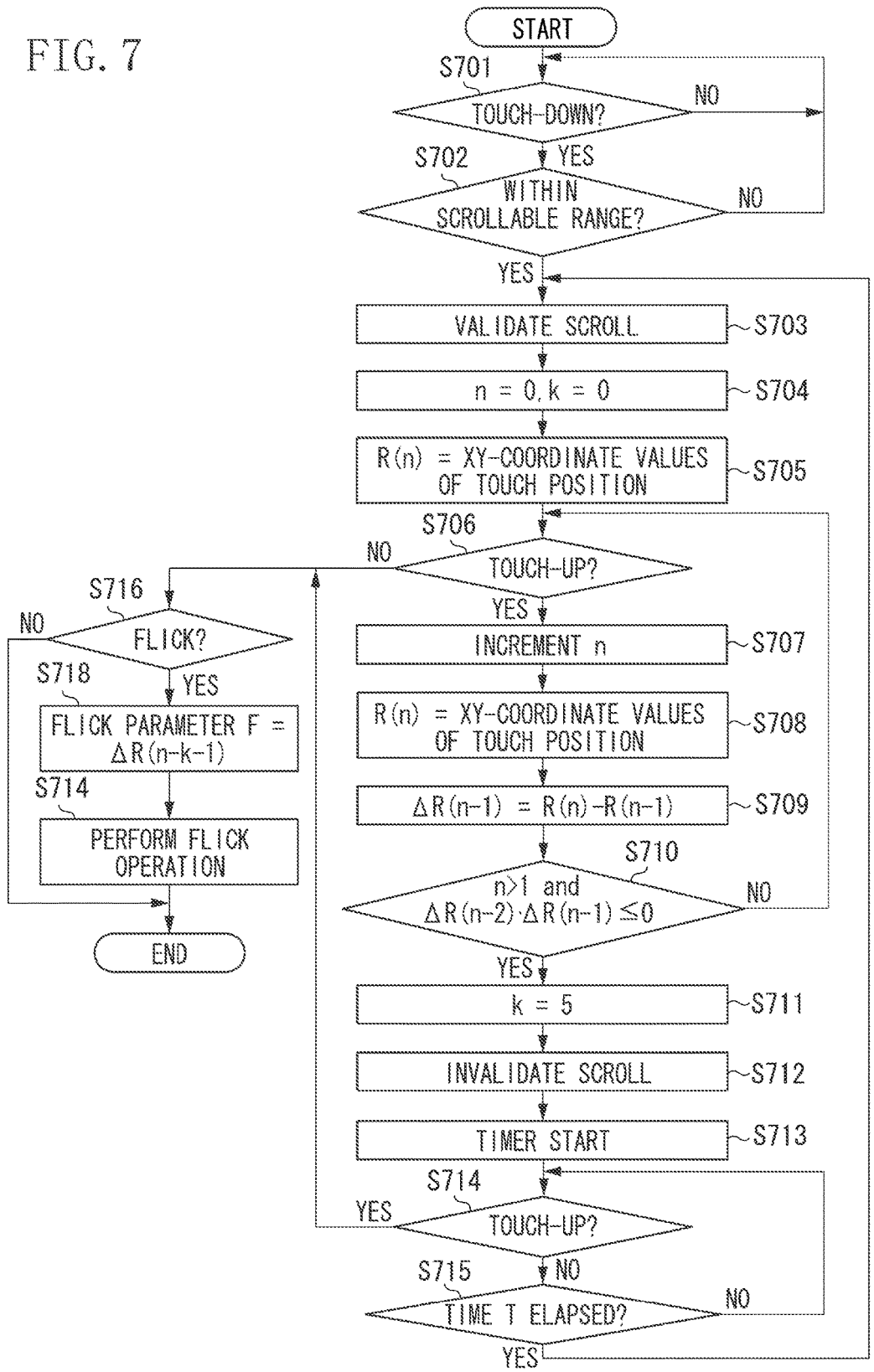
FIG. 7 is a flowchart illustrating an example of touch position detection processing according to an exemplary embodiment of the present disclosure.

FIG. 7 is a flowchart illustrating touch position detection processing that can be performed in a flick operation according to the present exemplary embodiment. At the start timing, it is assumed that there is not any object being in contact with the touch screen. In other words, the object is in the touch-off state.

In step S701, the CPU 101 determines whether a touch-down operation has been detected. If it is determined that the detected operation is Touch-Down (Yes in step S701), then in step S702, the CPU 101 determines whether a touch position is within a scrollable range. If the CPU 101 determines that the touch position is within the scrollable range (Yes in step S702), then in step S703, the CPU 101 validates the scroll.

In step S704, the CPU 101 resets the counter n (n=0) and initializes a variable k. In step S705, the CPU 101 stores XY coordinate values of the touch position as a variable R(n) in the memory 102. More specifically, the CPU 101 sequentially stores coordinate information about a plurality of touch positions, which has been detected immediately before the present, in the array variable R(n) of the memory 102. The variable R(n) represents a two-dimensional vector constituted by an X-coordinate value and a Y-coordinate value.

In step S706, the CPU 101 determines whether a touch-up operation has been detected. If the CPU 101 determines that the detected operation is Touch-Up (Yes in step S706), the operation proceeds to step S716. If it is determined that there is not any touch-up operation having been detected (No in step S706), then in step S707, the CPU 101 increments the counter n by one. In step S708, the CPU 101 stores XY coordinate values of the touch position as the variable R(n) in the memory 102.

In step S709, the CPU 101 calculates an XY coordinate variation vector $\Delta R(n-1)=R(n)-R(n-1)$ between the temporally neighboring touch positions. In step S710, the CPU 101 determines whether a condition n>1 and $\Delta R(n-2)\cdot \Delta R(n-1) \leq 0$ is satisfied. $\Delta R(n-2)\cdot \Delta R(n-1)$ is an inner product of $\Delta R(n-2)$ and $\Delta R(n-1)$. Satisfying the condition $\Delta R(n-2)\cdot \Delta R(n-1) \leq 0$ indicates that the moving direction of the touch position has been changed or the touch position has stopped. More specifically, the condition $\Delta R(n-2)\cdot \Delta R(n-1) \leq 0$ indicates an occurrence of change in the moving direction of the touch position. If the CPU 101 determines that the condition n>1 and $\Delta R(n-2)\cdot \Delta R(n-1) \leq 0$ is satisfied (Yes in step S710), the operation proceeds to step S711. Otherwise, the operation returns to step S706.

In step S711, the CPU 101 stores 5 as the variable k in the memory 102. Then, in step S712, the CPU 101 invalidates the scroll. In step S713, the CPU 101 causes the timer to start its operation.

In step S714, the CPU 101 determines whether a touch-up operation has been detected. If the CPU 101 determines that the detected operation is Touch-Up (Yes in step S714), the operation proceeds to step S716. If it is determined that there is not any touch-up operation having been detected (No in step S714), then in step S715, the CPU 101 determines whether time T has elapsed since the start of the timer operation in step S714. The time T is set to a time that is not reliable with respect to the input position immediately before the touch-up operation is performed. For example, the time T value having been set beforehand is approximately 50 milliseconds. If the CPU 101 determines that the time T has not elapsed (No in step S715), the operation returns to step S714. On the other hand, if the CPU 101 determines that the time T has elapsed (Yes in step S715), the operation proceeds to step S703.

In step S716, the CPU 101 determines whether a flick operation has been detected. If it is determined that the detected operation is Flick (Yes in step S716), then in step S717, the CPU 101 calculates a flick parameter $F=\Delta R(n-k-1)$ and stores the calculated value in the memory 102. The flick parameter F represents a two-dimensional vector constituted by a scroll direction and a scroll amount required to perform a flick operation. The value of the variable k is set to 0 (see step S704) before the CPU 101 performs the processing in step S711 and is set to 5 in step S711. More specifically, if a change in the moving direction of the touch position has been detected in step S710 immediately before the touch-up operation, there is a higher possibility of causing a deviation between flick direction and user's intent. Therefore, the CPU 101 sets a temporal variation obtained a predetermined time (corresponding to five consecutive detections) ago as the flick parameter F.

In step S718, the CPU 101 determines the scroll direction and the scroll amount based on the flick parameter F and performs a control (e.g., update of a map) reflecting the flick operation.

In the present exemplary embodiment, the CPU 101 changes the touch position where the flick parameter is calculated by checking if a change in the moving direction of the touch position is detected in a flick operation. Therefore, reducing a possibility that a user feels strangeness in flick input operation becomes feasible. More specifically, if a touch-up operation is performed in a state where there is not any change in the moving direction of the touch position, the CPU 101 performs a control reflecting the flick operation based on the last touch position. On the other hand, if a change in the moving direction of the touch position is detected before the touch-up operation, the CPU 101 performs a control reflecting the flick operation based on the touch position detected a predetermined time (corresponding a predetermined number of detections) ago.

A fourth exemplary embodiment will be described in detail below. Processing according to the fourth exemplary embodiment includes successively monitoring the gap between touch positions on a GUI that can detect a pinch-in/pinch-out input operation and detecting a touch position capable of reducing strangeness in feeling in the pinch-in/pinch-out input operation. For example, if a user performs a touch-down operation on the map portion of the GUI display screen dedicated to the maps application illustrated in FIG. 6, the map portion is brought into the scrollable state. In a state where the map portion is scrollable, the user can perform a pinch-in/pinch-out operation to reduce or enlarge the map portion. More specifically, the pinch-in/pinch-out operation in the present exemplary embodiment is a user operation for moving two "Touch-On" portions in such a way as to reduce the distance between them (i.e., pinch-in) or increase the distance between them (i.e., pinch-out) after the touch-down operation has been detected at two portions.

Figure 8:
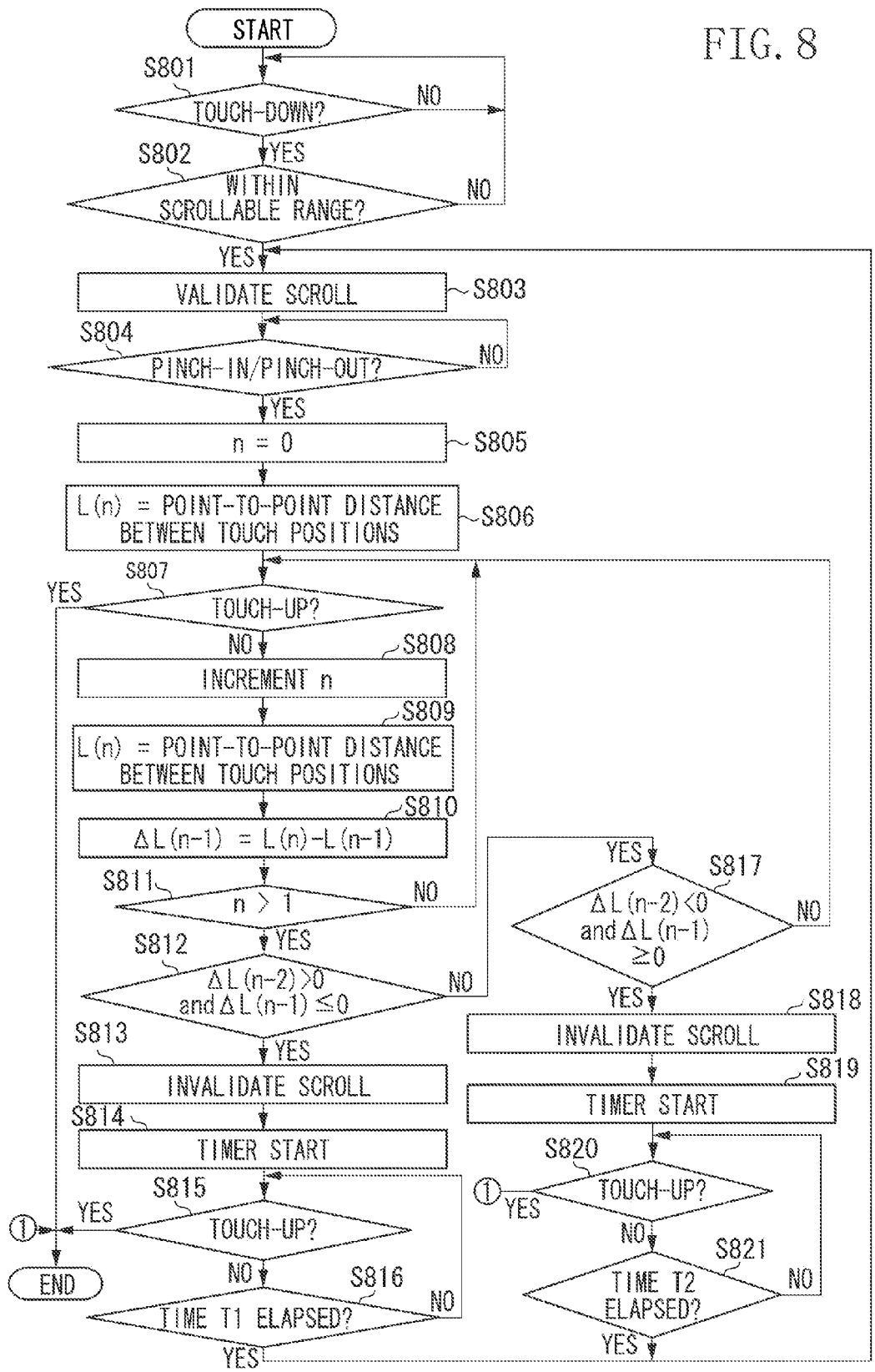
FIG. 8 is a flowchart illustrating an example of touch position detection processing according to an exemplary embodiment of the present disclosure.
Figure 9A:
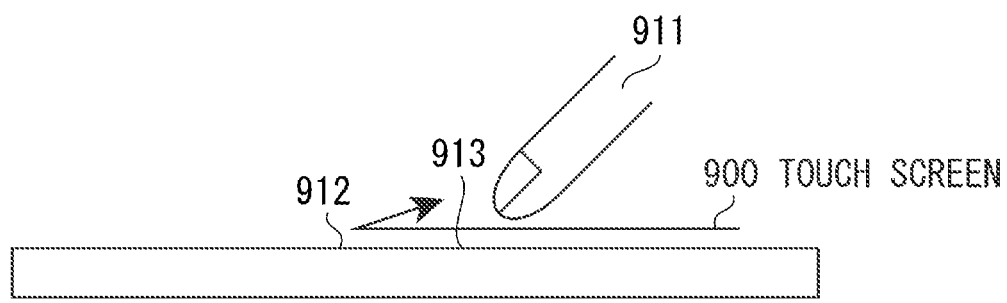
FIGS. 9A and 9B illustrate an object touch operation performed on a conventional touch screen.
Figure 9B:
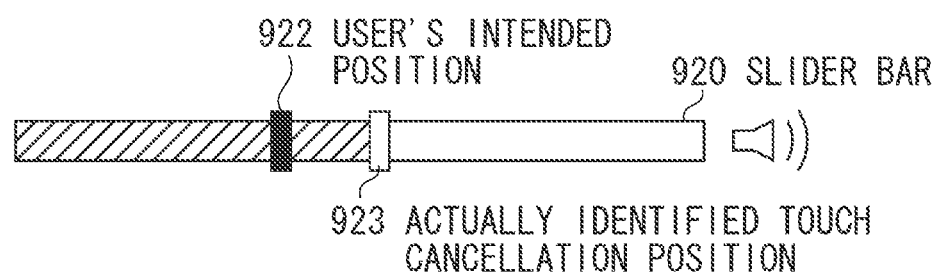

FIG. 8 is a flowchart illustrating touch position detection processing that can be performed in a pinch-in/pinch-out operation according to the present exemplary embodiment. At the start timing, it is assumed that there is not any object being in contact with the touch screen. In other words, the object is in the touch-off state.

In step S801, the CPU 101 determines whether a touch-down operation has been detected. If it is determined that the detected operation is Touch-Down (Yes in step S801), then in step S802, the CPU 101 determines whether a touch position is within a scrollable range. If it is determined that the touch position is within the scrollable range (Yes in step S802), then in step S803, the CPU 101 validates the scroll.

In step S804, the CPU 101 waits for a pinch-in/pinch-out input. If there is a pinch-in/pinch-out input (Yes in step S804), then in step S805, the CPU 101 resets the counter n (n=0). In step S806, the CPU 101 calculates a point-to-point distance L(n) between two touch positions and stores the calculated value in the memory 102.

In step S807, the CPU 101 determines whether a touch-up operation has been detected. If it is determined that the detected operation is Touch-Up (Yes in step S807), the CPU 101 terminates the touch position detection processing of the flowchart illustrated in FIG. 8. If the CPU 101 determines that there is not any touch-up operation having been detected (No in step S807), then in step S808, the CPU 101 increments the variable n by one. In step S809, the CPU 101 calculates a point-to-point distance L(n) between two temporally neighboring touch positions and stores the calculated value in the memory 102.

In step S810, the CPU 101 calculates a point-to-point distance variation $\Delta L(n-1)=L(n)-L(n-1)$ between the touch positions and stores the calculated value in the memory 102. In step S811, the CPU 101 determines whether the condition n>1 is satisfied. If the counter n is greater than 1 (Yes in step S811), the operation proceeds to step S812. If the counter n is equal to 1 (No in step S811), the operation returns to step S807.

In step S812, the CPU 101 determines whether a condition $\Delta L(n-2)>0$ and $\Delta L(n-1)\leq 0$ is satisfied. The condition $\Delta L(n-2)>0$ and $\Delta L(n-1)\leq 0$ indicates that the user operation has changed from the pinch-out operation for expanding the gap between two "Touch-On" points to the pinch-in operation for contracting the gap between them. If the above-mentioned condition is satisfied (Yes in step S812), then in step S813, the CPU 101 invalidates the scroll. Then, in step S814, the CPU 101 causes the timer to start its operation.

In step S815, the CPU 101 determines whether a touch-up operation has been detected. If it is determined that the detected operation is Touch-Up (Yes in step S815), the CPU 101 terminates the touch position detection processing of the flowchart illustrated in FIG. 8.

If the CPU 101 determines that there is not any touch-up operation having been detected (No in step S815), then in step S816, the CPU 101 determines whether time T1 has elapsed since the start of the timer operation. If the CPU 101 determines that the time T1 has elapsed (Yes in step S816), the operation returns to step S803. In general, the pinch-out operation is performed in such a way as to expand the gap between two fingers. Therefore, the user may close two fingers in performing the touch-up operation. The above-mentioned tendency appears when the user repetitively performs the pinch-out operation followed by the touch-up operation. The time T1 is a time during which the sequential operation shifting from Pinch-Out to Touch-Up may be erroneously determined as a pinch-in operation because of the closing movement of two fingers. For example, a setting value of the time T1 is approximately 150 milliseconds. If the CPU 101 determines that the time T1 has not elapsed (No in step S816), the operation returns to step S815.

If the CPU 101 determines that the condition $\Delta L(n-2)>0$ and $\Delta L(n-1)\leq 0$ is not satisfied (No in step S812), then in step S817, the CPU 101 determines whether a condition $\Delta L(n-2)<0$ and $\Delta L(n-1)\geq 0$ is satisfied. The condition $\Delta L(n-2)<0$ and $\Delta L(n-1)\geq 0$ indicates that the user operation has shifted from Pinch-In to Pinch-Out. If the above-mentioned condition is satisfied (Yes in step S817), then in step S818, the CPU 101 invalidates the scroll. Further, in step S819, the CPU 101 causes the timer to start its operation.

In step S820, the CPU 101 determines whether a touch-up operation has been detected. If it is determined that the detected operation is Touch-Up (Yes in step S820), the CPU 101 terminates the touch position detection processing of the flowchart illustrated in FIG. 8.

On the other hand, if the CPU 101 determines that there is not any touch-up operation having been detected (No in step S820), then in step S821, the CPU 101 determines whether time T2 has elapsed since the start of the timer operation. If the CPU 101 determines that the time T2 has elapsed (Yes in step S820), the operation returns to step S803. In general, a sequential operation shifting from Pinch-In to Touch-Up is performed as if the user picked up something with two fingers. Therefore, the possibility of causing a relative movement between two fingers will be lower if the user operation is Touch-Up, compared to the pinch-out operation. More specifically, when the user operation shifts from Pinch-In to Touch-Up, there will be a lower possibility that the CPU 101 erroneously detects a pinch-out operation. Therefore, a setting value of the time T2 is shorter than that of the time T1. For example, the time T2 is set to be 50 milliseconds.

The display control apparatus according to the present exemplary embodiment brings an effect of preventing a deviation from occurring between the displayed slider position in the pinch-in/pinch-out operation and the user's intended position by switching the scroll time inoperative immediately before the touch-up operation, between the pinch-in operation and the pinch-out operation. As a result, reducing the possibility that a user feels strangeness in operation becomes feasible.

In each of the above-mentioned exemplary embodiments, it is useful to set a specific mode, for example, when a user wears gloves. The display control apparatus can be configured to perform the above-mentioned processing only when the specific mode is set. If the setting mode is different from the above-mentioned specific mode, the display control apparatus can acquire a touch position actually detected in a touch-up operation and can perform processing based on the detected touch position.

The present disclosure is applicable to a personal computer as described in the exemplary embodiments. However, the present disclosure is not limited to the above-mentioned position input correction operations or controls. More specifically, the present disclosure is applicable to various apparatuses each including a touch screen as an operation unit. For example, the present disclosure is applicable to an imaging apparatus, such as a digital camera. The position input correction according to the present disclosure is useful when an imaging apparatus displays or reproduces a captured image recorded in a recording medium (e.g., a memory card) on a touch screen equipped display device provided on a back surface of the imaging apparatus. Further, the present disclosure is applicable to an apparatus having a touch screen, such as a personal digital assistant (PDA), a portable phone terminal, a portable image viewer, a printer equipped with a display device, a digital photo frame, a music player, a game machine, or an electronic book reader.

According to the present disclosure, it is feasible to prevent a deviation from occurring between actually detected touch position and operational feeling although it tends to occur when a user cancels a touch operation. Further, it is feasible to reduce an error operation that may occur due to the deviation in touch position.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2015-101425, filed May 18, 2015, and Japanese Patent Application No. 2016-081962, filed Apr. 15, 2016, each of which are hereby incorporated by reference herein in their entirety.

What is claimed is:

1. An information processing apparatus comprising:
   at least one processor; and
   at least one memory storing a program which, when executed by the at least one processor, causes the information processing apparatus to:
   detect an object that contacts a touch screen;
   sequentially store an object contact position while an object contact state is continuously detected;
   determine whether a moving direction of the object contact position has changed, with reference to the stored position;
   calculate an inner product of variations of temporally stored neighboring object contact positions; and
   invalidate the object contact position detected after determination of the change in the moving direction of the object contact position until termination of the continuous detection of the object contact state if a time elapsed after the determination of the change in the moving direction of the object contact position until the termination of the continuous detection of the object contact state is within a predetermined time,
   wherein the determination of the change in the moving direction of the object contact position is determined based on the calculation result.

2. The information processing apparatus according to claim 1, wherein the at least one processor further causes the information processing apparatus to invalidate the object contact position by preventing the processing based on the object contact position from being performed after the determination of the change in the moving direction of the object contact position until the termination of the continuous detection of the object contact state.

3. The information processing apparatus according to claim 1, wherein the at least one processor further causes the information processing apparatus to control a display to display a slider in such a way as to move on a slider bar displayed on the touch screen with reference to the object contact position, while the contact of the object is continuously detected, and
   wherein the slider is not moved based on the object contact position detected after the determination of the change in the moving direction of the object contact position until the termination of the continuous detection of the object contact state.

4. The information processing apparatus according to claim 1, wherein the at least one processor further causes the information processing apparatus to set any one of a plurality of modes, and
   wherein processing of the determination is performed when a specific mode is set.

5. A method for controlling an information processing apparatus, the method comprising:
   detecting an object that contacts a touch screen;
   sequentially storing an object contact position while an object contact state is continuously detected;
   determining whether a moving direction of the object contact position has changed, with reference to the stored position;
   calculating an inner product of variations of temporally stored neighboring object contact positions; and
   invalidating the object contact position detected after determination of the change in the moving direction of the object contact position until termination of the continuous detection of the object contact state if a time elapsed after the determination of the change in the moving direction of the object contact position until the termination of the continuous detection of the object contact state is within a predetermined time, wherein the determination of the change in the moving direction of the object contact position is determined based on the calculation result.

6. A non-transitory computer-readable storage medium storing a computer program that causes a computer to control an information processing apparatus, the program comprising:
- computer-executable instructions for detecting an object that contacts a touch screen;
- computer-executable instructions for sequentially storing an object contact position while an object contact state is continuously detected;
- computer-executable instructions for determining a moving direction of the object contact position has changed, with reference to the stored position;
- computer-executable instructions for calculating an inner product of variations of temporally stored neighboring object contact positions; and
- computer-executable instructions for invalidating the object contact position detected after determination of the change in the moving direction of the object contact position until termination of the continuous detection of the object contact state if a time elapsed after the determination of the change in the moving direction of the object contact position until the termination of the continuous detection of the object contact state is within a predetermined time,
- wherein the determination of the change in the moving direction of the object contact position is determined based on the calculation result.

\* \* \* \* \*